United States Patent [19]
Johnson et al.

[11] Patent Number: 4,573,849
[45] Date of Patent: Mar. 4, 1986

[54] SPOUT AIMER WITH FEED ROLL ROTATION SENSING

[75] Inventors: Stanley J. Johnson, Cedar Falls; Gary L. Gold, Waterloo, both of Iowa

[73] Assignee: Deere & Company, Moline, Ill.

[21] Appl. No.: 756,919

[22] Filed: Jul. 18, 1985

Related U.S. Application Data

[63] Continuation of Ser. No. 482,690, Apr. 6, 1983, abandoned.

[51] Int. Cl.⁴ ............................................. B65G 67/22
[52] U.S. Cl. ..................................... 414/334; 56/10.2; 56/46.6; 222/63; 222/533; 406/28; 406/165
[58] Field of Search ............... 414/133, 293, 294, 301, 414/302, 335, 345, 334; 406/28, 30, 165; 239/659, 688; 198/631; 193/22, 23; 56/10.2, 16.4, 16.6; 222/63, 526, 533

[56] References Cited

U.S. PATENT DOCUMENTS

| | | | |
|---|---|---|---|
| 2,475,404 | 7/1949 | Reed | 414/323 X |
| 3,166,204 | 1/1965 | deBuhr | 414/335 |
| 3,514,929 | 6/1970 | Cornish et al. | 56/10.2 |
| 3,599,402 | 8/1971 | Heising et al. | 56/2 |
| 3,609,947 | 10/1971 | Herbsthofer | 56/10.2 |
| 3,786,945 | 1/1974 | Symonds | 414/335 |
| 3,910,286 | 10/1975 | Phoenix et al. | 56/10.2 X |
| 3,985,394 | 10/1976 | Rolfes | 406/165 X |
| 4,042,132 | 8/1977 | Bohman et al. | 414/335 |
| 4,332,127 | 6/1982 | Staiert et al. | 56/10.2 |
| 4,376,609 | 3/1983 | Bohman et al. | 414/335 |
| 4,401,403 | 8/1983 | Johnson et al. | 414/335 |
| 4,441,846 | 4/1984 | Johnson | 414/335 |

FOREIGN PATENT DOCUMENTS

| | | | |
|---|---|---|---|
| 2073914 | 10/1981 | United Kingdom | |
| 765160 | 9/1980 | U.S.S.R. | 414/294 |

OTHER PUBLICATIONS

Electronics Engineers Handbook, pp. 10-16, 1975 Edition.
Handbook of Transducers for Electronic Measuring Systems, pp. 540-543, 1969 Edition.
E. C. Lundahl, Invention Disclosure, Jan. 1, 1981 and May 15, 81, pp. 32, 122, 224, 229 and not numbered.
U.S. patent application, Ser. No. 482,691, Filed Apr. 6, 1983.

Primary Examiner—Joseph E. Valenza
Assistant Examiner—Stuart J. Millman

[57] ABSTRACT

A spout aiming control system for a forage harvester includes a sweep mode wherein the spout is automatically moved to provide even wagon filling under certain conditions. A magnetic pickup senses rotation of the forage harvester feed rolls. A disable system prevents operation of the sweep mode unless the feed rolls are rotating faster than a threshold rotation speed. A warning signal is generated if the pickup signal indicates that the feed rolls are not rotating and the pickup has an open circuit condition.

6 Claims, 10 Drawing Figures

SPOUT AIMER WITH FEED ROLL ROTATION SENSING

This is a continuation of application Ser. No. 482,690, filed Apr. 6, 1983, now abandoned.

BACKGROUND OF THE INVENTION present invention relates to a control system for aiming the spout of a forage harvester.

Various automatic forage harvester spout aiming control systems are known. Such systems are described in U.S. Pat. Nos. 3,786,945 and 4,042,132 and in 4,376,609. Other such systems are described in U.S. Pat. Nos. 4,401,403 and 4,441,846, both assigned to the assignee of the present invention. A microprocessor-based spout aiming system is described in co-pending U.S. patent application, Ser. No. 482,691, filed Apr. 6, 1983, now U.S. Pat. No. 4,529,348, and also assigned to the assignee of the present invention. This latter system includes a spout sweeping operational mode wherein, under certain conditions, the spout is automatically swept in a step-wise manner among a plurality of positions, all within a wagon forage-receiving range or window of positions. This sweeping of the spout helps to promote even wagon filling. However, energy efficiency can be increased by preventing sweeping of the spout when the forage harvester feed rolls are not rotating and no crop is being discharged from the spout.

SUMMARY OF THE INVENTION

An object of the present invention is to provide a forage harvester spout-aiming system which achieves uniform wagon filling without producing unnecessary spout movements.

A more particular object of the present invention is to provide a spout-aiming control system which has an automatic spout-sweeping operational mode which is disabled when the feed rolls are not rotating.

A further object of the present invention is to provide such a spout-aiming control system with a diagnostic capability.

These and other objects are achieved by the present invention which includes a microprocessor-based control unit which automatically aims the forage harvester spout as a function of sensed parameters, such as the wagon-tongue angle. The control unit automatically sweeps the spout through a series of sweep mode positions under certain conditions. A magnetic pickup is mounted adjacent to one of the drive chain sprockets associated with the forage harvester feed rolls to sense the rotation thereof. The control unit receives the signal from the magnetic pickup and responds by preventing sweep mode spout movement if the signal indicates that the feed rolls are not rotating. The control unit also generates an alarm signal in response to an open circuit failure of the pickup.

DETAILED DESCRIPTION

Figure 1:
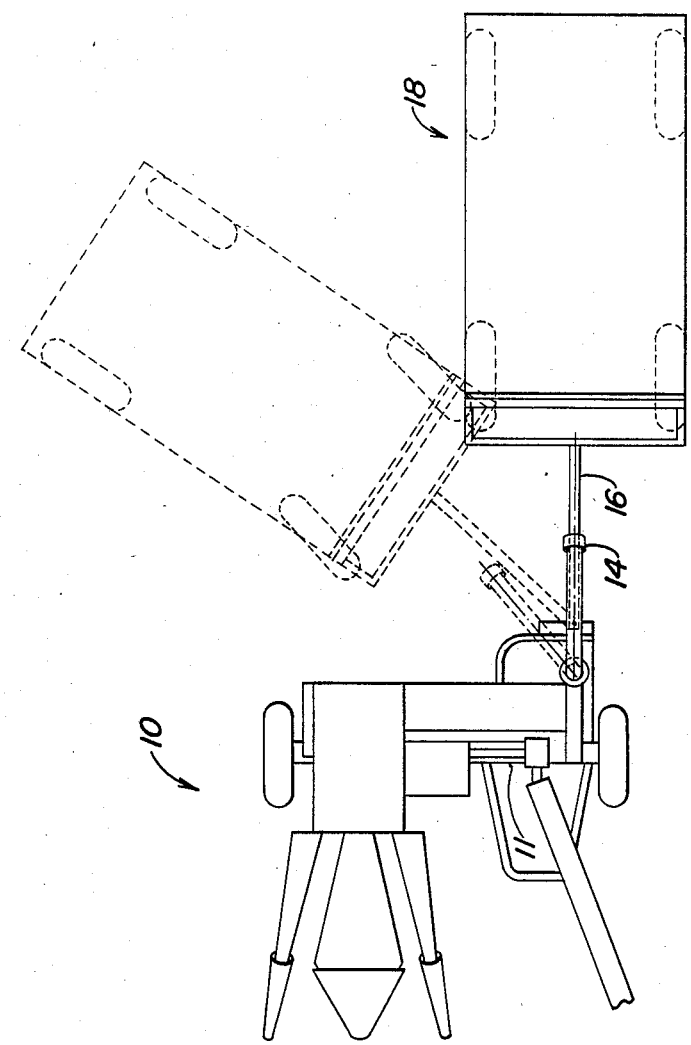
FIG. 1 is an illustration of a typical agricultural machine, such as a forage harvester, with a crop-receiving wagon hitched thereto.

As seen in FIG. 1, a tractor-drawn forage harvester 10, or a self-propelled forage harvester, (not shown), includes a drawbar which is hidden from view by a rotatable forage dispensing spout 14. The tongue 16 of a wagon 18 is hitched to the drawbar so that the wagon 18 receives the material discharged from the spout 14. The conventional forage harvester 10 includes conventional power means 11 for propelling crop through the discharge spout 14.

Figure 2:
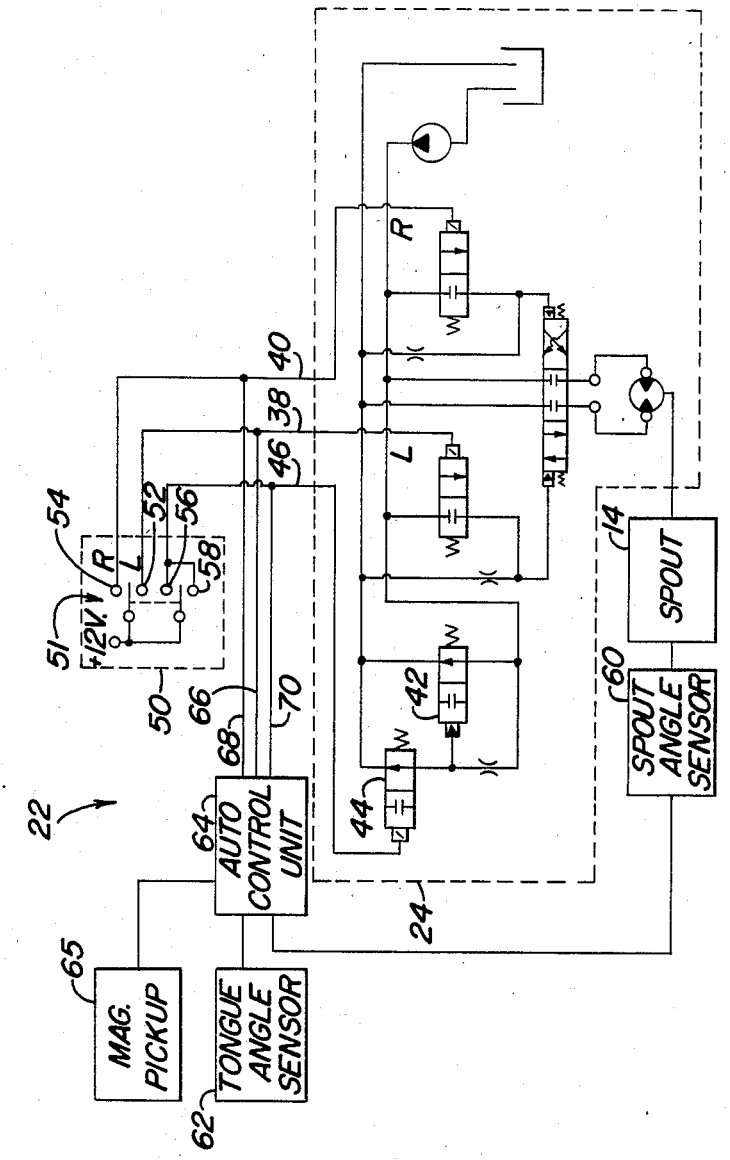
FIG. 2 is a schematic representation of a spout-aiming control system according to the present invention.

A control system 22, schematically shown in FIG. 2, controls the position of the spout 14, either automatically or manually, via a known electrohydraulic circuit 24, which is currently used in production forage harvesters to rotate the spout 14 left or right.

A manual directional control switch module 50 includes a double pole, double throw momentary-type switch 51 with one side of both poles connected to the +12 volt terminal of the vehicle battery or power supply. Left and right switch contacts 52 and 54 are connected to left and right input or control lines 38 and 40, respectively. Optional open center contacts 56 and 58 are both connected to control line 46 so that valve 44 is actuated to close bypass valve 42 whenever switch 51 is in contact with contacts 52 or 54.

Control system 22 also includes a spout angle sensor 60 and a tongue angle sensor 62, both of which preferably consist of conventional rotary potentiometers connected to generate voltages indicative of the spout angle and the tongue angle. The spout angle voltage generated by spout angle sensor 60 may be considered to be the feedback signal for the automatic control circuit 64.

Figure 3:
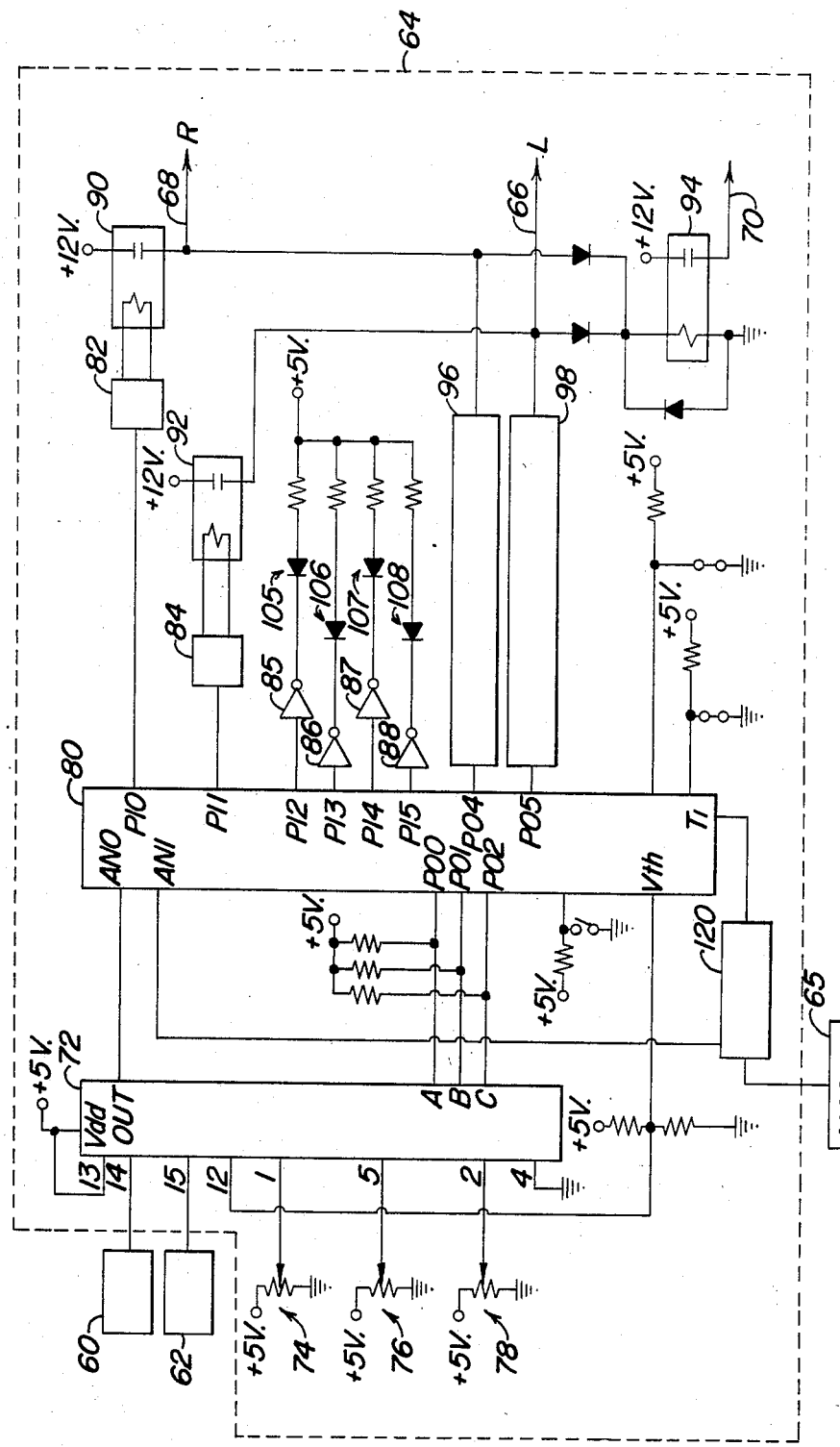
FIG. 3 is a circuit schematic of a control unit constructed according to the present invention.

Referring now to FIG. 3, the spout and tongue angle sensors 60 and 62 are connected to inputs of a conventional multiplexer 72. Potentiometers 74, 76 and 78 are also coupled to input pins 1, 5 and 2 of the multiplexer 72 and provide adjustable calibration signals. The multiplexer 72 feeds selected signals to the analog input ANO of a microprocessor 80. The microprocessor 80 automatically generates spout aiming control signals at outputs P10 and P11 according to a particular control algorithm, preferably such as described in detail in the aforementioned U.S. Pat. No. 4,529,348.

Signals generated by the microprocessor 80 are applied to the address inputs (not shown) of the multiplexer 72, to relay drivers 82 and 84, and to LED drivers 85, 86, 87 and 88. The LED drivers drive corresponding left and right spout indicator lights 105 and 106 and left and right tongue indicator lights 107 and 108, which are preferably located on an operator-observable panel. Relay drivers 82 and 84 drive relays 90 and 92, respectively, in response to control signals generated at micro outputs P10 and P11 to operate respective pilot valves of circuit 24.

Lines 68 and 66 are connected to relay sensing inputs P04 and P05 of the micro 80 via identical voltage limiting and filtering circuits 96 and 98. The system described up to this point is preferably the same as that described in the aforementioned U.S. Pat. No. 4,529,348, which is incorporated by reference herein.

Figure 10:
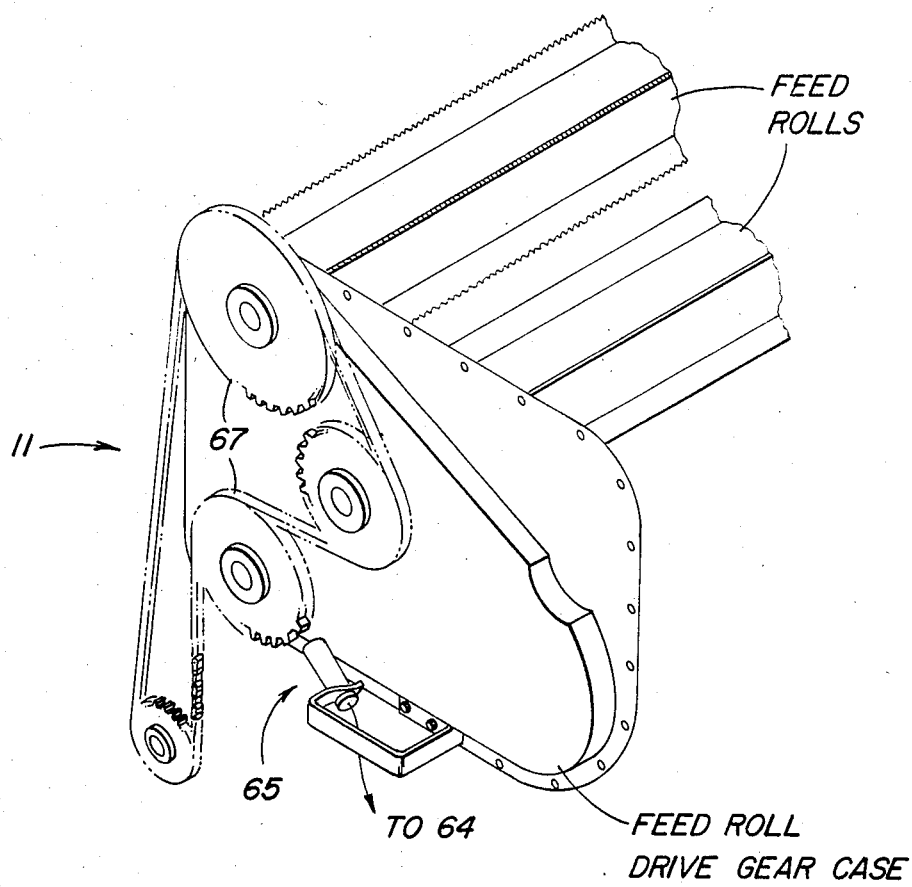
FIG. 10 is a view showing the mounting of the mag pickup adjacent the feed roll drive sprockets of a conventional forage harvester.

To this system, the present invention provides the addition of a magnetic pickup 65 which, as best seen in FIG. 10, is preferably mounted adjacent to one of the forage harvester feed roll drive chain sprockets 67 so as to sense the rotation of the feed roll which is driven thereby. The magnetic pickup is preferably a known type such as currently used on agricultural vehicles and manufactured by Wabash or Motorola.

The present invention also provides the addition of a circuit 120 which couples mag pickup 65 to Micro ports T1 and AN1. Circuit 120 will be described later with reference to FIG. 4. The automatic control circuit 64 generates left and right control signals in output lines 66 and 68 and in output line 70, as a function of the position of the tongue and the spout and of the feed roll rotation. Output lines 66, 68 and 70 are connected to control lines 38, 40 and 46, respectively. For further information, relating to the control unit 64, the reader is again referred to the aforementioned U.S. Pat. No. 4,529,348.

Figure 4:
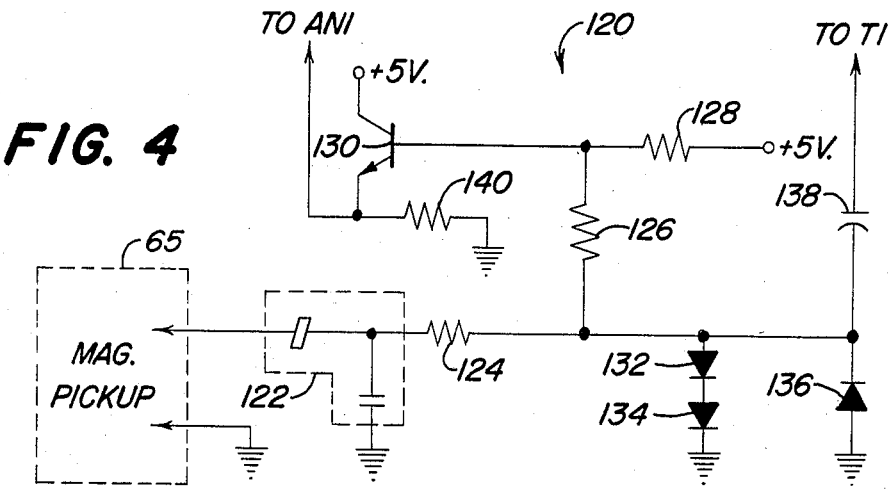
FIG. 4 is a circuit schematic of a mag pickup sensing circuit included in the control unit of FIG. 3

Referring now to the circuit 120 of FIG. 4, the mag pickup 65 is coupled through an LC filter 122 (with a ferrite bead type inductor) to resistor 124. Resistor 124 is coupled to resistor 126, to ground via diodes 132, 134 and 136 and to micro AC input port T1 via capacitor 138. Resistor 126 is coupled to +5 volts via resistor 128 and to the base of transistor 130. The collector of transistor 130 is coupled to +5 volts. The emitter of transistor 130 is coupled to ground via resistor 140 and to the micro port AN1. Thus, the mag pickup generates an AC signal which has a frequency proportional to the feed roll rotation speed and circuit 120 communicates this AC signal to micro AC input T1. Circuit 120 also communicates to micro port AN1 a DC voltage level which is high when the mag pickup is open-circuited and which is low when the mag pickup is not open-circuited. The purpose for this will become apparent from the description which follows.

The micro 80 includes a built-in comparator (not shown) which is coupled to the AC input, T1. The result is that the output of this built-in comparator is high on the positive half cycle of the mag pickup voltage at diodes 132 and 136 and is low on the negative half cycle of the mag pickup voltage. The output of this comparator is examined during operation of the algorithm which is described later herein.

Turning now to FIGS. 5–9, the magnetic pickup-related control algorithm illustrated therein operates in conjunction with a main spout control algorithm (not shown). Briefly, this main control algorithm controls the aiming of the spout as a function of sensed spout and wagon tongue positions. The main control algorithm includes a sweep mode delay timer which prevents movement of the spout to the next sweep mode position unless the sweep mode delay timer has timed out. For more information concerning this main spout control algorithm, the reader is again referred to the aforementioned U.S. Pat. No. 4,529,348.

The mag pickup algorithm of FIGS. 5–7 and 9 is preferably performed after step 218 or step 246 and immediately prior to step 268 of the main spout control algorithm. The mag pickup algorithm of FIG. 8 is preferably performed after step 348 of the main spout control algorithm and returns to either step 350 or 374 of the main algorithm.

It should be further pointed out that it is also preferable for a software counter value, designated MBSTEP, to be decremented at step 230 (not shown) of the main spout control algorithm. This periodically changes the value of MBSTEP at a desired rate so that step 1102 of the mag pickup algorithm will cause the indicator lights 105–108 to be sequentially lighted.

Figure 5:
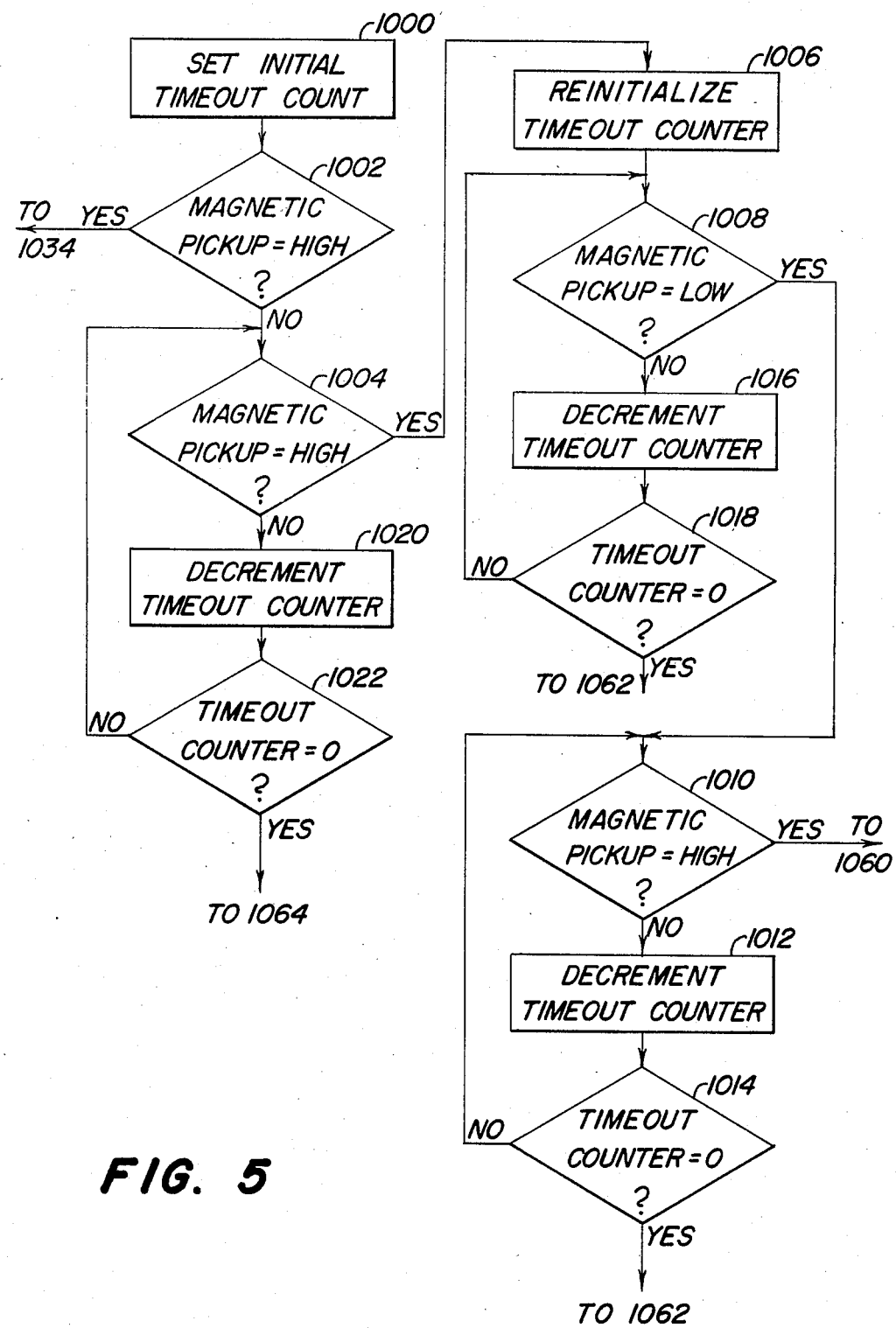
FIGS. 5–8 are logic flow diagrams of a control algorithm executed by the present invention.

Turning now to FIG. 5, step 1000 initially sets a software "timeout" counter to a value which is chosen so the timeout counter will periodically time out at a 20 Hz rate. Then, step 1002 determines if the mag pickup voltage (the output of the built-in comparator) is high. If yes, the algorithm skips ahead to step 1034. If not, the algorithm proceeds to step 1004 which again examines the mag pickup voltage. If this voltage is now high, it means that a low-to-high transition has occurred and the algorithm proceeds to step 1006. Otherwise, the algorithm is directed to step 1020.

At step 1006, the timeout counter is reinitialized, then step 1008 determines whether the mag pickup signal is low. If the signal is low, the algorithm proceeds to step 1010; else, to step 1016. Step 1010 again determines if the mag pickup signal is high. If yes, it means that the signal has a frequency which is greater than 50 Hz (corresponding to a feed roll rotation rate which is greater than approximately one-half of the rated rpm of the forage harvester P.T.O.) and the algorithm is directed to step 1060. If no, the algorithm proceeds to step 1012 which decrements the timeout counter. Then, step 1014 examines the timeout counter value and directs the algorithm back to step 1010 if the timeout counter value is not zero. If the timeout counter value equals zero, this indicates a mag pickup signal frequency of less than 50 Hz and the algorithm is directed to step 1062.

Returning to 1008, if the mag pickup signal is not low, then the algorithm proceeds to step 1016 which also decrements the timeout counter. Then, 1018 examines the timeout counter value and directs the algorithm back to step 1008 or to step 1062 (which indicates a mag pickup signal frequency of less than 50 Hz).

Returning to step 1004, if the pickup signal is not high, then the algorithm proceed to steps 1020 and 1022. Steps 1020 and 1022 operate to return the algorithm to step 1004 or else, to step 1064 which indicates no or very slow rotation of the feed rolls.

In short, steps 1002 to 1022 determine whether the frequency of the mag pickup signal is greater than or less than 50 Hz or zero, in the case where the mag pickup signal (at the output of the built-in comparator) initially makes a low-to-high transition.

Figure 6:
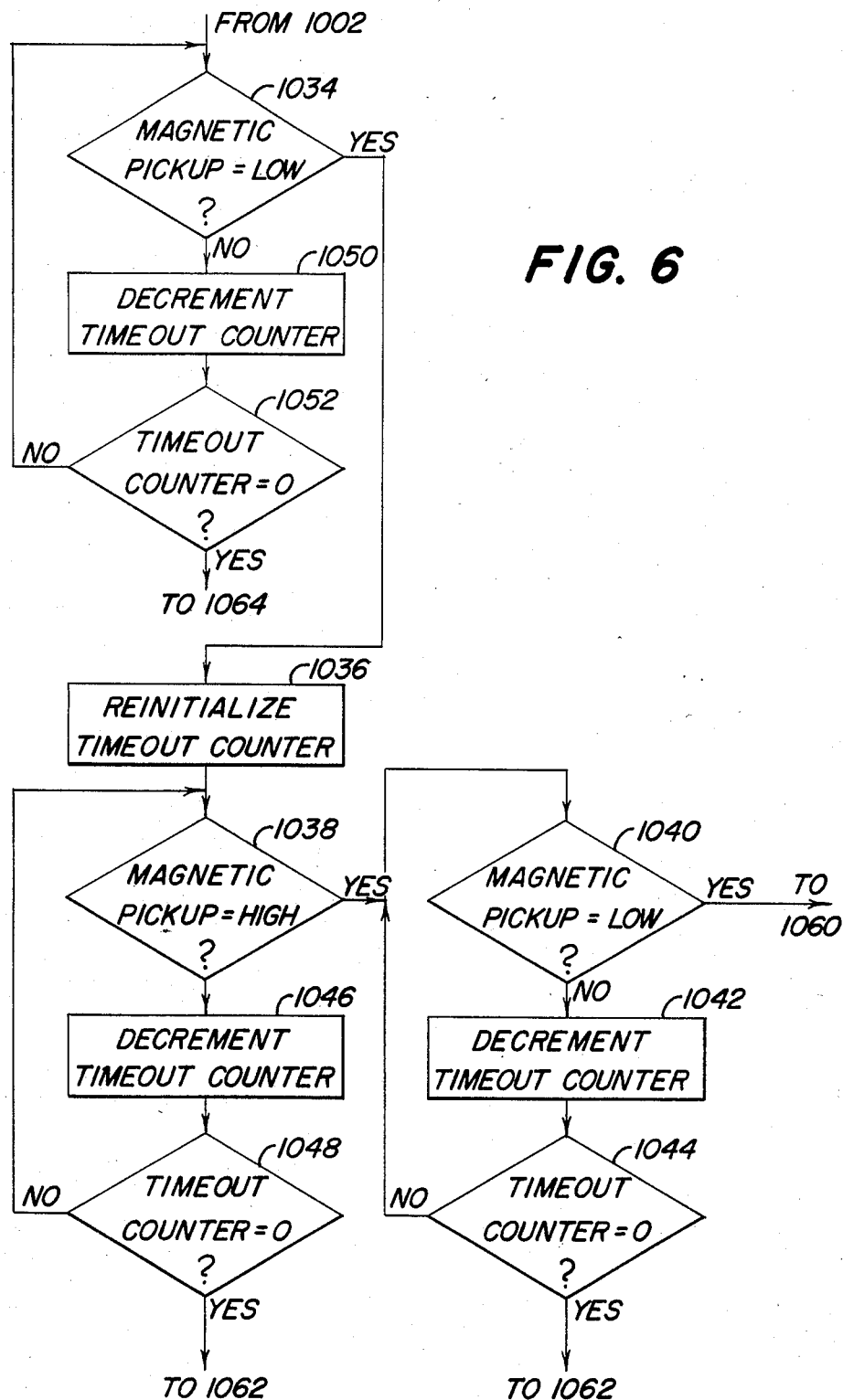

Turning to FIG. 6, steps 1034 to 1052 make the same determination as steps 1002–1022, except for the case where the mag pickup signal initially makes a high-to-low transition. In particular, step 1040 directs the algorithm to step 1060 if the frequency is greater than 50 Hz, steps 1044 and 1048 direct the algorithm to step 1062 if the frequency is less than 50 Hz and step 1052 directs the algorithm to step 1064 if the frequency is zero or very low.

Figure 7:
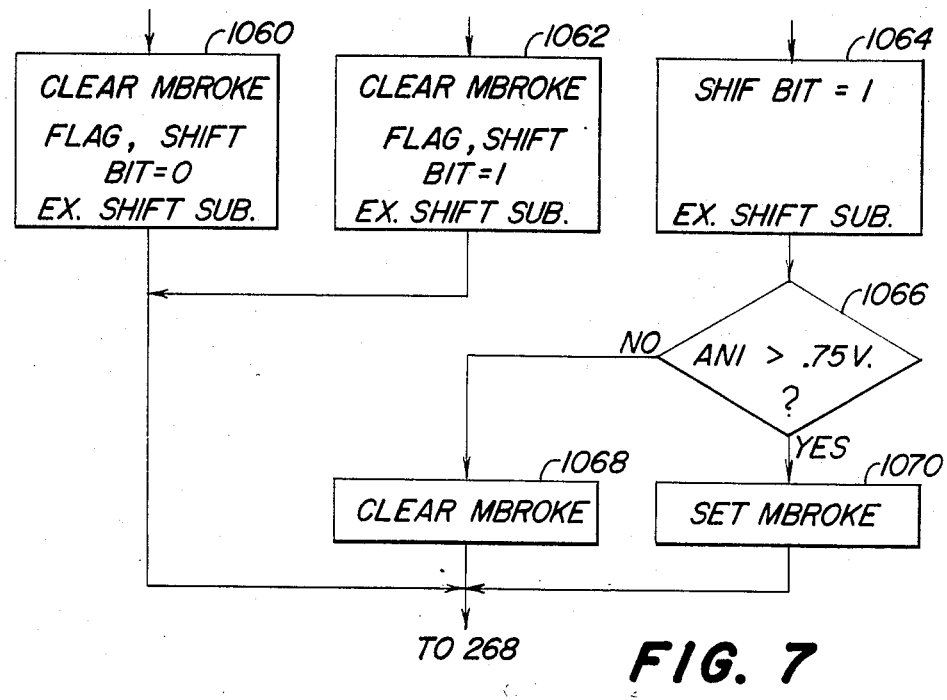
Figure 8:
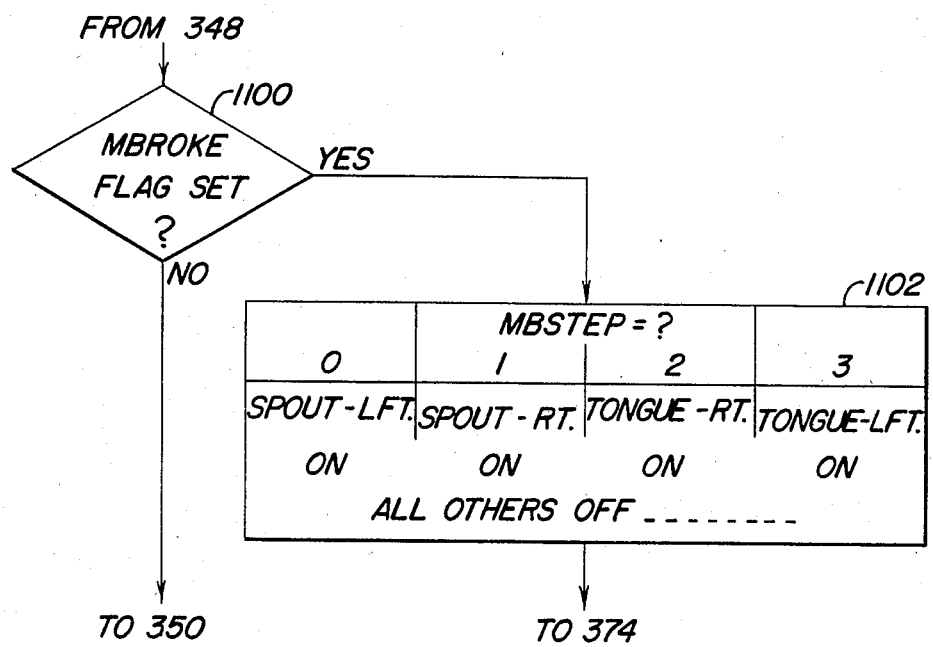

Turning now to FIG. 7, step 1060 clears an MBROKE flag, sets a shift bit equal to 0 and executes a shift subroutine which will now be described with reference to FIG. 9.

Figure 9:
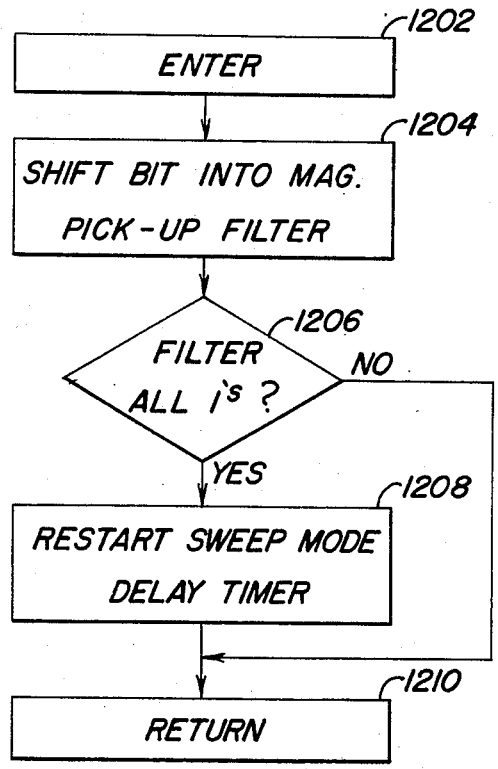
FIG. 9 is a logic flow diagram of a shift-bit subroutine included in the logic flow diagram of FIG. 7.

The shift subroutine of FIG. 9 is entered at 1202. Then, at step 1204, the shift bit is shifted into an 8-bit mag pickup filter (or register) which is integral to the microprocessor and therefore, not shown. Next, step 1206 determines if all 8 bits of the mag pickup filter are 1s. If not, the routine is directed to step 1210. If yes, it means that at least 8 consecutive shift bits have indicated a zero Hz or no feed roll rotation condition, and the routine is directed to step 1208 which restarts the sweep mode delay time of the main spout control algorithm. As long as the mag pickup filter contains all 1s, then the sweep mode delay timer will be continuously restarted and sweep mode operation will be prevented under this no feed roll rotation condition. However, if a 0 has been shifted into the mag pickup filter, as via step 1060, then the subroutine will proceed directly to step 1210 which causes a return to the algorithm of FIG. 7 without restarting of the sweep mode delay time. Returning now to FIG. 7, step 1062 clears the MBROKE flag, sets the shift bit equal to 1 and again executes the shift bit subroutine of FIG. 9. After steps 1060 or 1062, the algorithm proceeds to step 268 of the main spout control algorithm.

Step 1064, which is entered when there is no feed roll rotation, sets the shift bit equal to 1 and executes the shift bit subroutine of FIG. 9. After step 1064, step 1066 determines whether the voltage at micro input AN1 is greater than a threshold voltage of 0.75 volts. If yes, it means that the mag pickup 65 has an open circuit and the algorithm is directed to step 1070 which sets the MBROKE flag. If not, it means that the mag pickup 65 does not have an open circuit and the algorithm proceeds to step 1068 which clears the MBROKE flag. After steps 1068 and 1070, the algorithm again returns to step 268 of the main spout control algorithm.

Turning now to FIG. 8, step 1100, which is preferably entered after step 348 (in its "NO" branch) of the main spout control algorithm, determines whether the MBROKE flag has been set. If yes, the algorithm proceeds to step 1102 which causes only a particular one of the indicator lights 105–108 to be turned on, depending upon the MBSTEP counter value which was incremented in main spout control algorithm step 232, as previously described. This causes the indicator lights to be sequentially turned on whenever the MBROKE flag indicates that the mag pickup has an open circuit. After 1102, the algorithm returns to step 374 of the main spout control algorithm. On the other hand, if there is no mag pickup open circuit condition, the MBROKE flag will not be set and step 1100 will direct the algorithm to step 350 of the main spout control algorithm.

The conversion of the above-described flow chart into a standard language for implementing the algorithm described by the flow chart in a digital data processor, such as a microprocessor, will be evident to those with ordinary skill in the art.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. In a forage harvester having rotatable feed rolls and a movable spout for directing crop to a crop-receiving wagon coupled thereto, characterized by:
   control means for automatically moving the spout to evenly fill the wagon, the control means comprising a sweep mode timer which expires after a predetermined time period and means for preventing automatic movement of the spout unless the sweep mode timer has expired;
   rotation sensing means for sensing the rotation of the feed rolls; and
   disable means for preventing automatic movement of the spout by the control means when the rotation sensing means detects that the feed rolls are rotating slower than a certain rotation speed, the disable means comprising means for periodically restarting the sweep mode timer to prevent expiration thereof unless the feed rolls are rotating faster than said certain rotation speed.

2. The invention of claim 1, further comprising:
   warning means for generating a warning signal in response to a failure condition of the rotation sensing means.

3. The invention of claim 2, wherein:
   the rotation sensing means comprises a magnetic pickup having an inductive coil; and
   the warning means comprises means for applying a D.C. bias voltage across the coil, said voltage having a first level when the coil is open-circuited and having a second level when the coil is not open-circuited, the warning means further comprising means for comparing the coil voltage to a reference voltage and for generating a warning signal when the coil voltage exceeds the reference voltage.

4. The invention of claim 2, wherein the rotation sensing means comprises:
   a magnetic pickup which generates a pickup signal having transitions at intervals determined by the rotation speed of the feed rolls.

5. The invention of claim 4, wherein the disable means comprises:
   interval measuring means for measuring the intervals between transitions of the pickup signal and for setting a shift data bit equal to a first value if the interval is less than a threshold interval and for setting the shift data bit equal to a second value if the interval is longer than said threshold interval;
   shift means for shifting the shift data bit into a multi-bit register; and
   the disable means preventing automatic movement of the spout when all bits of the multi-bit register are the second value.

6. The invention of claim 5, wherein:
   the rotation sensing means comprises a magnetic pickup having an inductive coil;
   the warning means comprises means for applying a D.C. bias voltage across the coil, said voltage having a first level when the coil is open-circuited and having a second level when the coil is not open-circuited, the warning means further comprising means for comparing the coil voltage to a reference voltage and for generating a warning signal when the coil voltage exceeds the reference voltage; and
   the interval sensing means including means for preventing generation of the warning signal unless the interval measuring means indicates that the feed rolls are not rotating.

* * * * *